United States Patent
Sarokin et al.

(10) Patent No.: US 12,271,990 B2
(45) Date of Patent: Apr. 8, 2025

(54) SYSTEMS AND METHODS FOR OPTIMIZATION OF GRAPHICS PROCESSING FOR MACHINE LEARNING INFERENCE

(71) Applicant: Google LLC, Mountain View, CA (US)

(72) Inventors: Raman Sarokin, Zürich (CH); Juhyun Lee, Palo Alto, CA (US)

(73) Assignee: GOOGLE LLC, Mountain View, CA (US)

( * ) Notice: Subject to any disclaimer, the term of this patent is extended or adjusted under 35 U.S.C. 154(b) by 77 days.

(21) Appl. No.: 18/091,671

(22) Filed: Dec. 30, 2022

(65) Prior Publication Data

US 2023/0334747 A1  Oct. 19, 2023

Related U.S. Application Data

(60) Provisional application No. 63/331,593, filed on Apr. 15, 2022.

(51) Int. Cl.
| | | |
|---|---|---|
| *G06T 15/00* | (2011.01) | |
| *G06T 1/20* | (2006.01) | |
| *G06T 15/04* | (2011.01) | |

(52) U.S. Cl.
CPC .......... *G06T 15/005* (2013.01); *G06T 1/20* (2013.01); *G06T 15/04* (2013.01)

(58) Field of Classification Search
CPC ......... G06T 15/005; G06T 1/20; G06T 15/04; G06T 1/60; G06T 15/80; G06T 2200/28; G06N 5/04; G06N 20/00; H04N 7/15
See application file for complete search history.

(56) References Cited

U.S. PATENT DOCUMENTS 7,219,085 B2   5/2007  Buck et al.
7,548,892 B2 *  6/2009  Buck .................. G06N 3/08
                                                382/157

(Continued)

FOREIGN PATENT DOCUMENTS

JP   2021089487   6/2021

OTHER PUBLICATIONS

Japanese Translation Only of Kuwabara et al., "Parallel Processing of Implicit Function Rendering on Web Browser", The Institute of Electronics, Information and Communication Engineers, IEICE Technical Report, 2016, pp. 139-144.

(Continued)

*Primary Examiner* — Vijay Shankar
(74) *Attorney, Agent, or Firm* — DORITY & MANNING P.A.

(57) ABSTRACT

Systems and methods of the present disclosure are directed to a method for optimizing utilization of graphics processors for machine learning inference tasks. The method includes simultaneously rendering, by a computing system comprising one or more computing devices, a plurality of textures from an input to a machine-learned model. The method includes generating, by the computing system, a plurality of shaders based at least in part on a layout of the plurality of textures, wherein each of the plurality of shaders corresponds to at least one operator of a plurality of operators of the machine-learned model. The method includes processing, by the computing system using a Graphics Processing Unit (GPU), the plurality of textures with the plurality of shaders to obtain a machine-learning output for the machine-learned model.

18 Claims, 8 Drawing Sheets

(56) References Cited

U.S. PATENT DOCUMENTS

| | | | | |
|---|---|---|---|---|
| 7,598,953 | B2* | 10/2009 | Tarditi, Jr. | G06F 8/45 |
| | | | | 345/522 |
| 7,733,347 | B2* | 6/2010 | Tarditi, Jr. | G06F 9/45508 |
| | | | | 345/506 |
| 7,800,620 | B2* | 9/2010 | Tarditi, Jr. | G06F 9/45508 |
| | | | | 345/643 |
| 10,339,443 | B1 | 7/2019 | Medioni | |
| 10,552,321 | B2* | 2/2020 | Gould | G06T 1/60 |
| 10,949,345 | B2* | 3/2021 | Gould | G06F 12/0802 |
| 10,979,672 | B1 | 4/2021 | Krol et al. | |
| 2007/0211064 | A1* | 9/2007 | Buck | G06N 20/00 |
| | | | | 345/519 |

OTHER PUBLICATIONS

Japanese Translation Only of Suzuki et al., "GPU Implementation of Convolutional Face Finder", Dept. of General Systems Studies, Graduate School of Arts and Sciences, The University of Tokyo, IPSJ SIG Technical Report, Feb. 21, 2006, pp. 75-80.

Lee et al., "On-Device Neural Net Inference with Mobile GPUs", Jul. 3, 2019, arXiv:1907.01989v1, 9 pages.

Wikipedia, "Multiple Render Targets", https://en.wikipedia.org/wiki/Multiple_Render_Targets, retrieved on Mar. 31, 2023, 1 page.

Xiao et al., "GPU accelerated self-organizing map for high dimensional data", Neural Processing Letters 41, Oct. 11, 2014, pp. 341-355.

Real-Time Rendering, "WebGL 2 Basics", Sep. 30, 2016, https://www.realtimerendering.com/blog/webgl-2-basics/, Retrieved on Aug. 26, 2024, 9 pages.

* cited by examiner

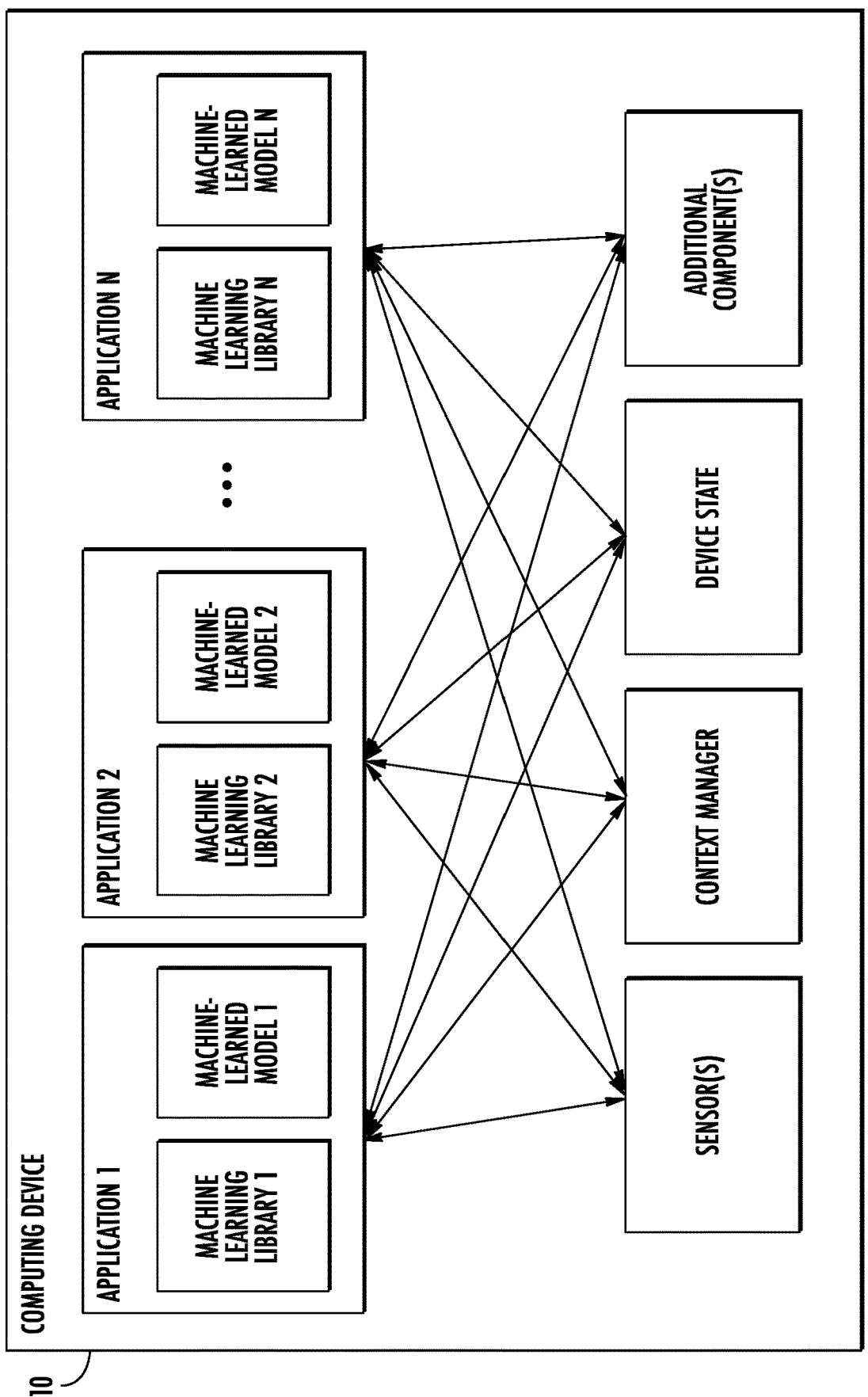

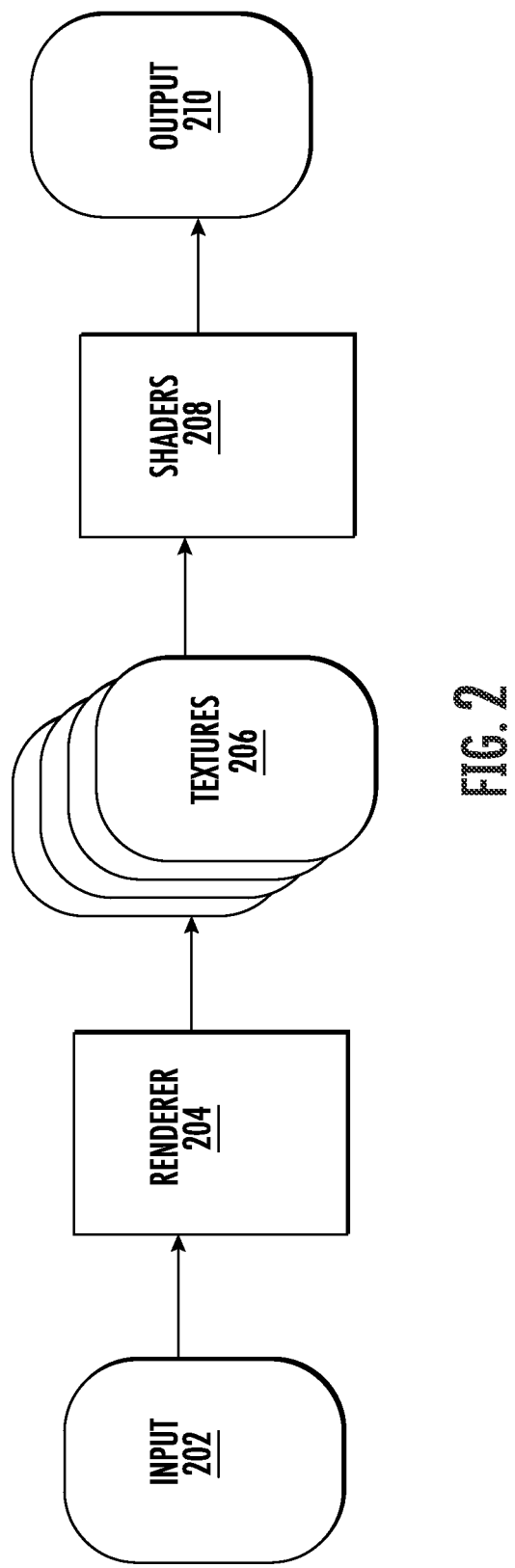

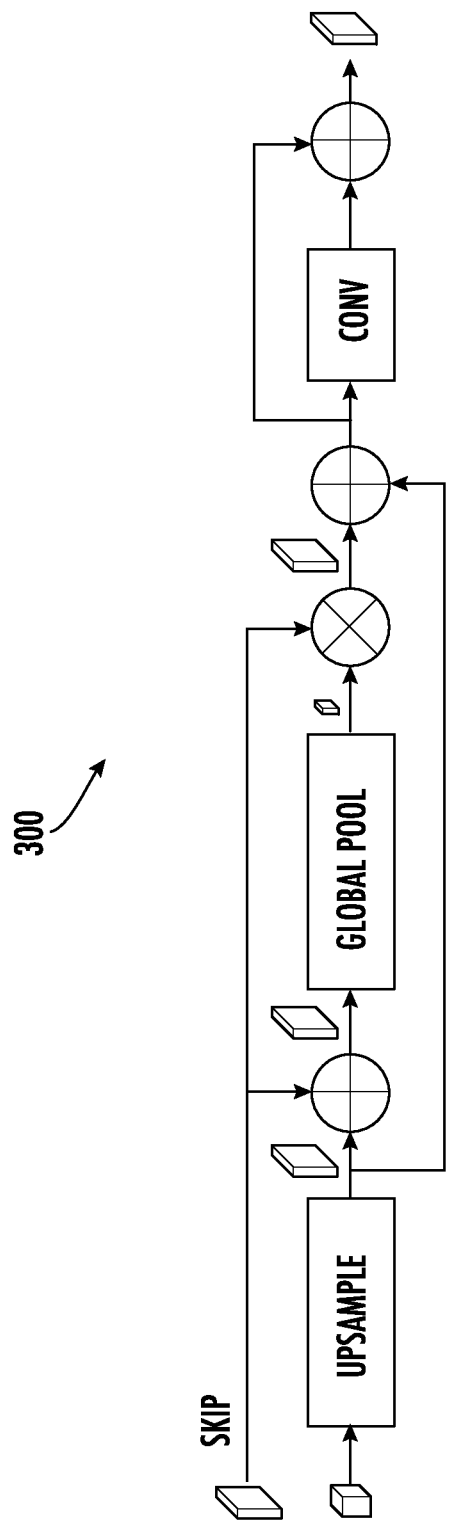

SYSTEMS AND METHODS FOR OPTIMIZATION OF GRAPHICS PROCESSING FOR MACHINE LEARNING INFERENCE

RELATED APPLICATIONS

This application claims priority to and the benefit of U.S. Provisional Patent Application No. 63/331,593, filed Apr. 15, 2022. U.S. Provisional Patent Application No. 63/331,593 is hereby incorporated by reference in its entirety.

FIELD

The present disclosure relates generally to optimizing utilization of system resources. More particularly, the present disclosure relates to optimizing usage of graphics processing hardware via application programming interfaces for machine learning inference.

BACKGROUND

Recently, many applications have begun to leverage machine learning to significantly optimize the performance of various tasks (e.g., videoconferencing, image recognition services, etc.). However, in certain execution environments, such as web browsers, these applications generally lack the capacity to efficiently utilize the bandwidth of specialized hardware (e.g., graphics processing units) for processing of machine learning inference tasks.

SUMMARY

Aspects and advantages of embodiments of the present disclosure will be set forth in part in the following description, or can be learned from the description, or can be learned through practice of the embodiments.

One example aspect of the present disclosure is directed to a computing system for optimizing utilization of graphics processors for machine learning inference tasks. The computing system includes one or more processors, wherein the one or more processors comprises a Graphics Processing Unit (GPU). The computing system includes one or more non-transitory computer-readable media that collectively store instructions that, when executed by the one or more processors, cause the computing system to perform operations. The operations include simultaneously rendering a plurality of textures from an input to a machine-learned model. The operations include generating a plurality of shaders based at least in part on a layout of the plurality of textures, wherein each of the plurality of shaders corresponds to at least one operator of a plurality of operators of the machine-learned model. The operations include processing, using the GPU, the plurality of textures with the plurality of shaders to obtain a machine-learning output for the machine-learned model.

Another example aspect of the present disclosure is directed to a method for optimizing utilization of graphics processors for machine learning inference tasks. The method includes simultaneously rendering, by a computing system comprising one or more computing devices, a plurality of textures from an input to a machine-learned model. The method includes generating, by the computing system, a plurality of shaders based at least in part on a layout of the plurality of textures, wherein each of the plurality of shaders corresponds to at least one operator of a plurality of operators of the machine-learned model. The method includes processing, by the computing system using a Graphics Processing Unit (GPU), the plurality of textures with the plurality of shaders to obtain a machine-learning output for the machine-learned model.

Another example aspect of the present disclosure is directed to one or more non-transitory computer-readable media that collectively store instructions that, when executed by the one or more processors, cause the computing system to perform operations. The operations include simultaneously rendering a plurality of textures from an input to a machine-learned model. The operations include generating a plurality of shaders based at least in part on a layout of the plurality of textures, wherein each of the plurality of shaders corresponds to at least one operator of a plurality of operators of the machine-learned model. The operations include processing, using a GPU, the plurality of textures with the plurality of shaders to obtain a machine-learning output for the machine-learned model.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIG. 1B depicts a block diagram of an example computing device that performs utilization of graphics processors for machine learning inference tasks according to example embodiments of the present disclosure.

FIG. 2 depicts a data flow diagram for optimizing utilization of graphics processors for machine learning inference tasks according to example embodiments of the present disclosure.

FIG. 3 illustrates a data flow diagram for an implemented decoder block according to some embodiments of the present disclosure.

Figure 1A:
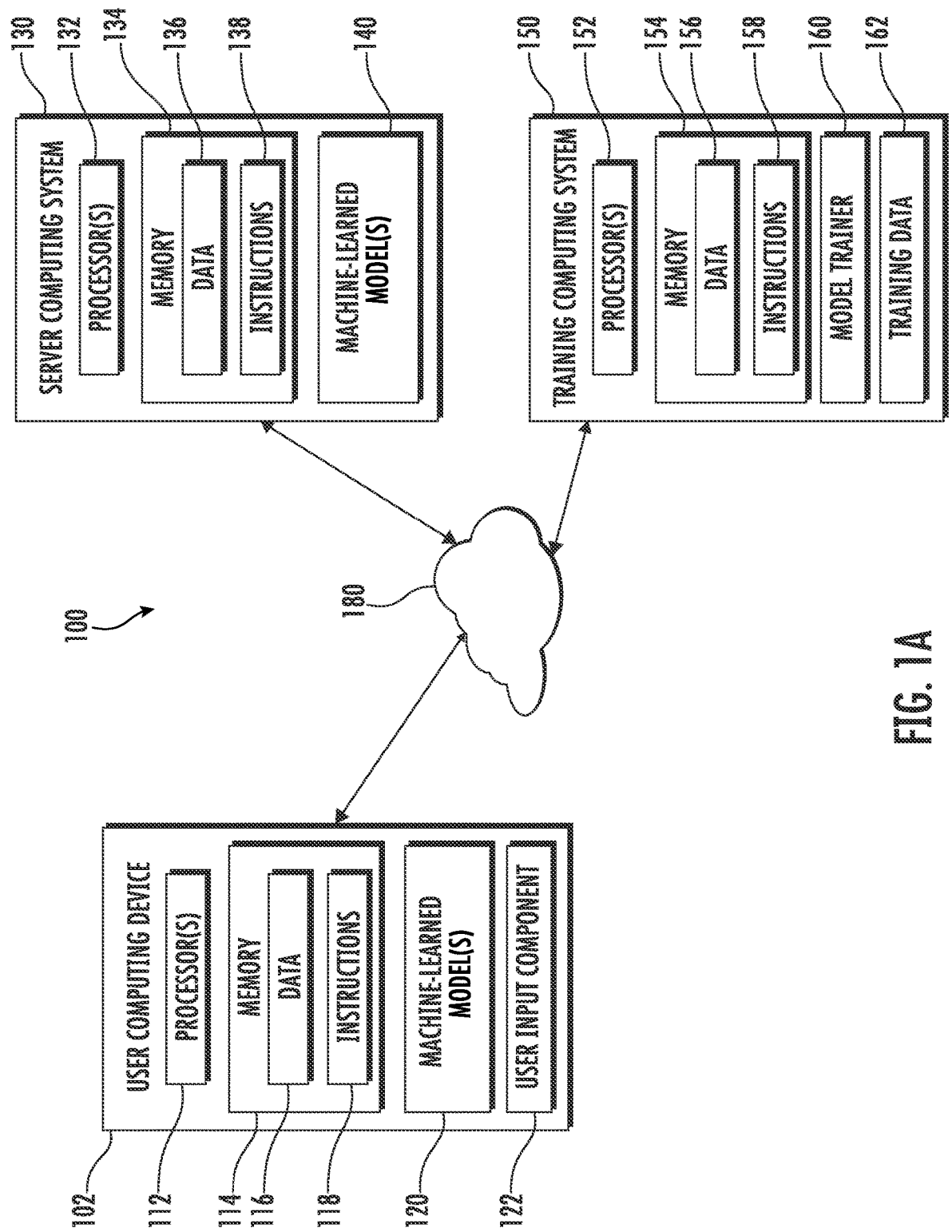
FIG. 1A depicts a block diagram of an example computing system that optimizes utilization of graphics processors for machine learning inference tasks according to example embodiments of the present disclosure.

Reference numerals that are repeated across plural figures are intended to identify the same features in various implementations.

DETAILED DESCRIPTION

Overview

Generally, the present disclosure is directed to optimizing utilization of system resources. More particularly, the present disclosure relates to optimizing usage of graphics processing hardware via application programming interfaces for machine learning inference. Specifically, for example, an input (e.g., image input data for an image segmentation task, etc.) can be obtained for trained machine-learned model that is utilized by an application executed within a web browser (e.g., a videoconferencing application, etc.). To obtain a high quality result, the application may leverage specialized hardware such as a graphics processing units (GPUs) for processing of the machine learned model via an application programming interface. However, some conventional application programming interfaces (APIs) lack the capacity to optimally utilize the bandwidth of a GPU (e.g., WebGL API, etc.).

Accordingly, systems and methods of the present disclosure propose to optimize utilization of graphics processors for machine learning inference tasks. For example, after obtaining the input, a plurality of textures can be simultaneously rendered from the input to the machine learned model (e.g., via a Multi-Render Targets (MRT) process of a WebGL API, etc.). A plurality of shaders (e.g., fragment shaders, etc.) can next be generated based at least in part on a layout of the plurality of textures (e.g., a number of textures, dimensions of the textures, etc.). Each of the plurality of shaders can correspond to at least one operator of a plurality of operators of the machine learned model. Utilizing the GPU, the plurality of textures can be processed with the plurality of shaders to obtain a machine-learning output for the machine-learned model.

Systems and methods of the present disclosure provide a number of technical effects and benefits. As one example technical effects and benefit, shader operations performed by the GPU incur a certain degree of overhead. As GPUs are heavily parallelized, inefficiencies can arise when the complexity of shader operations are less than the overhead. Accordingly, by leveraging existing features of certain APIs, such as the MRT feature of WebGL, embodiments of the present disclosure can complicate the shader operations by translating a model input to a plurality of textures, therefore substantially increasing utilization of GPU bandwidth (e.g., via parallelization, etc.). In turn, by increasing GPU bandwidth utilization, embodiments of the present disclosure facilitate more efficient model utilization and provision of higher quality model outputs, while also reducing or eliminating any processing bottlenecks at the GPU (e.g., therefore reducing power usage, compute cycles, memory usage, etc. associated with bottlenecks).

With reference now to the Figures, example embodiments of the present disclosure will be discussed in further detail.

Example Devices and Systems

FIG. 1A depicts a block diagram of an example computing system 100 that optimizes utilization of graphics processors for machine learning inference tasks according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, an FPGA, a controller, a microcontroller, etc.) and can be one processor or a plurality of processors that are operatively connected. For example, the processor(s) 112 may include one or more Graphics Processing Unit(s) (GPUs). These GPUs can be leveraged via application programming interfaces (APIs) accessed by applications executed by the user computing device (102) and/or other computing devices (e.g., the server computing system 130, etc.). The memory 114 can include one or more non-transitory computer-readable storage media, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more models 120. For example, the models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Some example machine-learned models can leverage an attention mechanism such as self-attention. For example, some example machine-learned models can include multi-headed self-attention models (e.g., transformer models).

In some implementations, the one or more models 120 can be received from the server computing system 130 over network 180, stored in the user computing device memory 114, and then used or otherwise implemented by the one or more processors 112. In some implementations, the user computing device 102 can implement multiple parallel instances of a single model 120 (e.g., to perform parallel processing across multiple instances of the models).

Additionally or alternatively, one or more models 140 can be included in or otherwise stored and implemented by the server computing system 130 that communicates with the user computing device 102 according to a client-server relationship. For example, the models 140 can be implemented by the server computing system 130 as a portion of a web service (e.g., an image segmentation service, an image recognition service, etc.). Thus, one or more models 120 can be stored and implemented at the user computing device 102 and/or one or more models 140 can be stored and implemented at the server computing system 130.

The user computing device 102 can also include one or more user input components 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, an FPGA, a controller, a microcontroller, etc.) and can be one processor or a plurality of processors that are operatively connected. The memory 134 can include one or more non-transitory computer-readable storage media, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Some example machine-learned models can leverage an attention mechanism such as self-attention. For example, some example machine-learned models can include multi-headed self-attention models (e.g., transformer models).

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, an FPGA, a controller, a microcontroller, etc.) and can be one processor or a plurality of processors that are operatively connected. The memory 154 can include one or more non-transitory computer-readable storage media, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. For example, a loss function can be back-propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated backpropagation through time. The model trainer 160 can perform a number of generalization techniques (e.g., weight decays, dropouts, etc.) to improve the generalization capability of the models being trained.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM, hard disk, or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The machine-learned models described in this specification may be used in a variety of tasks, applications, and/or use cases.

In some implementations, the input to the machine-learned model(s) of the present disclosure can be image data. The machine-learned model(s) can process the image data to generate an output. As an example, the machine-learned model(s) can process the image data to generate an image recognition output (e.g., a recognition of the image data, a latent embedding of the image data, an encoded representation of the image data, a hash of the image data, etc.). As another example, the machine-learned model(s) can process the image data to generate an image segmentation output. As another example, the machine-learned model(s) can process the image data to generate an image classification output. As another example, the machine-learned model(s) can process the image data to generate an image data modification output (e.g., an alteration of the image data, etc.). As another example, the machine-learned model(s) can process the image data to generate an encoded image data output (e.g., an encoded and/or compressed representation of the image data, etc.). As another example, the machine-learned model(s) can process the image data to generate an upscaled image data output. As another example, the machine-learned model(s) can process the image data to generate a prediction output.

In some implementations, the input to the machine-learned model(s) of the present disclosure can be text or natural language data. The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a translation output. As another example, the machine-learned model(s) can process the text or natural language data to generate a classification output. As another example, the machine-learned model(s) can process the text or natural language data to generate a textual segmentation output. As another example, the machine-learned model(s) can process the text or natural language data to generate a semantic intent output. As another example, the machine-learned model(s) can process the text or natural language data to generate an upscaled text or natural language output (e.g., text or natural language data that is higher quality than the input text or natural language, etc.). As another example, the machine-learned model(s) can process the text or natural language data to generate a prediction output.

In some implementations, the input to the machine-learned model(s) of the present disclosure can be speech data. The machine-learned model(s) can process the speech data to generate an output. As an example, the machine-learned model(s) can process the speech data to generate a speech recognition output. As another example, the machine-learned model(s) can process the speech data to generate a speech translation output. As another example, the machine-learned model(s) can process the speech data to generate a latent embedding output. As another example, the machine-learned model(s) can process the speech data to generate an encoded speech output (e.g., an encoded and/or compressed representation of the speech data, etc.). As another example, the machine-learned model(s) can process the speech data to generate an upscaled speech output (e.g., speech data that is higher quality than the input speech data, etc.). As another example, the machine-learned model(s) can process the speech data to generate a textual representation output (e.g., a textual representation of the input speech data, etc.). As another example, the machine-learned model(s) can process the speech data to generate a prediction output.

In some implementations, the input to the machine-learned model(s) of the present disclosure can be latent encoding data (e.g., a latent space representation of an input, etc.). The machine-learned model(s) can process the latent encoding data to generate an output. As an example, the machine-learned model(s) can process the latent encoding data to generate a recognition output. As another example, the machine-learned model(s) can process the latent encoding data to generate a reconstruction output. As another example, the machine-learned model(s) can process the latent encoding data to generate a search output. As another example, the machine-learned model(s) can process the latent encoding data to generate a reclustering output. As another example, the machine-learned model(s) can process the latent encoding data to generate a prediction output.

In some implementations, the input to the machine-learned model(s) of the present disclosure can be statistical data. Statistical data can be, represent, or otherwise include data computed and/or calculated from some other data source. The machine-learned model(s) can process the statistical data to generate an output. As an example, the machine-learned model(s) can process the statistical data to generate a recognition output. As another example, the machine-learned model(s) can process the statistical data to generate a prediction output. As another example, the machine-learned model(s) can process the statistical data to generate a classification output. As another example, the machine-learned model(s) can process the statistical data to generate a segmentation output. As another example, the machine-learned model(s) can process the statistical data to generate a visualization output. As another example, the machine-learned model(s) can process the statistical data to generate a diagnostic output.

In some implementations, the input to the machine-learned model(s) of the present disclosure can be sensor data. The machine-learned model(s) can process the sensor data to generate an output. As an example, the machine-learned model(s) can process the sensor data to generate a recognition output. As another example, the machine-learned model(s) can process the sensor data to generate a prediction output. As another example, the machine-learned model(s) can process the sensor data to generate a classification output. As another example, the machine-learned model(s) can process the sensor data to generate a segmentation output. As another example, the machine-learned model(s) can process the sensor data to generate a visualization output. As another example, the machine-learned model(s) can process the sensor data to generate a diagnostic output. As another example, the machine-learned model(s) can process the sensor data to generate a detection output.

In some cases, the machine-learned model(s) can be configured to perform a task that includes encoding input data for reliable and/or efficient transmission or storage (and/or corresponding decoding). For example, the task may be an audio compression task. The input may include audio data and the output may comprise compressed audio data. In another example, the input includes visual data (e.g. one or more images or videos), the output comprises compressed visual data, and the task is a visual data compression task. In another example, the task may comprise generating an embedding for input data (e.g. input audio or visual data).

In some cases, the input includes visual data and the task is a computer vision task. In some cases, the input includes pixel data for one or more images and the task is an image processing task. For example, the image processing task can be image classification, where the output is a set of scores, each score corresponding to a different object class and representing the likelihood that the one or more images depict an object belonging to the object class. The image processing task may be object detection, where the image processing output identifies one or more regions in the one or more images and, for each region, a likelihood that region depicts an object of interest. As another example, the image processing task can be image segmentation, where the image processing output defines, for each pixel in the one or more images, a respective likelihood for each category in a predetermined set of categories. For example, the set of categories can be foreground and background. As another example, the set of categories can be object classes. As another example, the image processing task can be depth estimation, where the image processing output defines, for each pixel in the one or more images, a respective depth value. As another example, the image processing task can be motion estimation, where the network input includes multiple images, and the image processing output defines, for each pixel of one of the input images, a motion of the scene depicted at the pixel between the images in the network input.

In some cases, the input includes audio data representing a spoken utterance and the task is a speech recognition task. The output may comprise a text output which is mapped to the spoken utterance. In some cases, the task comprises encrypting or decrypting input data. In some cases, the task comprises a microprocessor performance task, such as branch prediction or memory address translation.

FIG. 1A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

FIG. 1B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
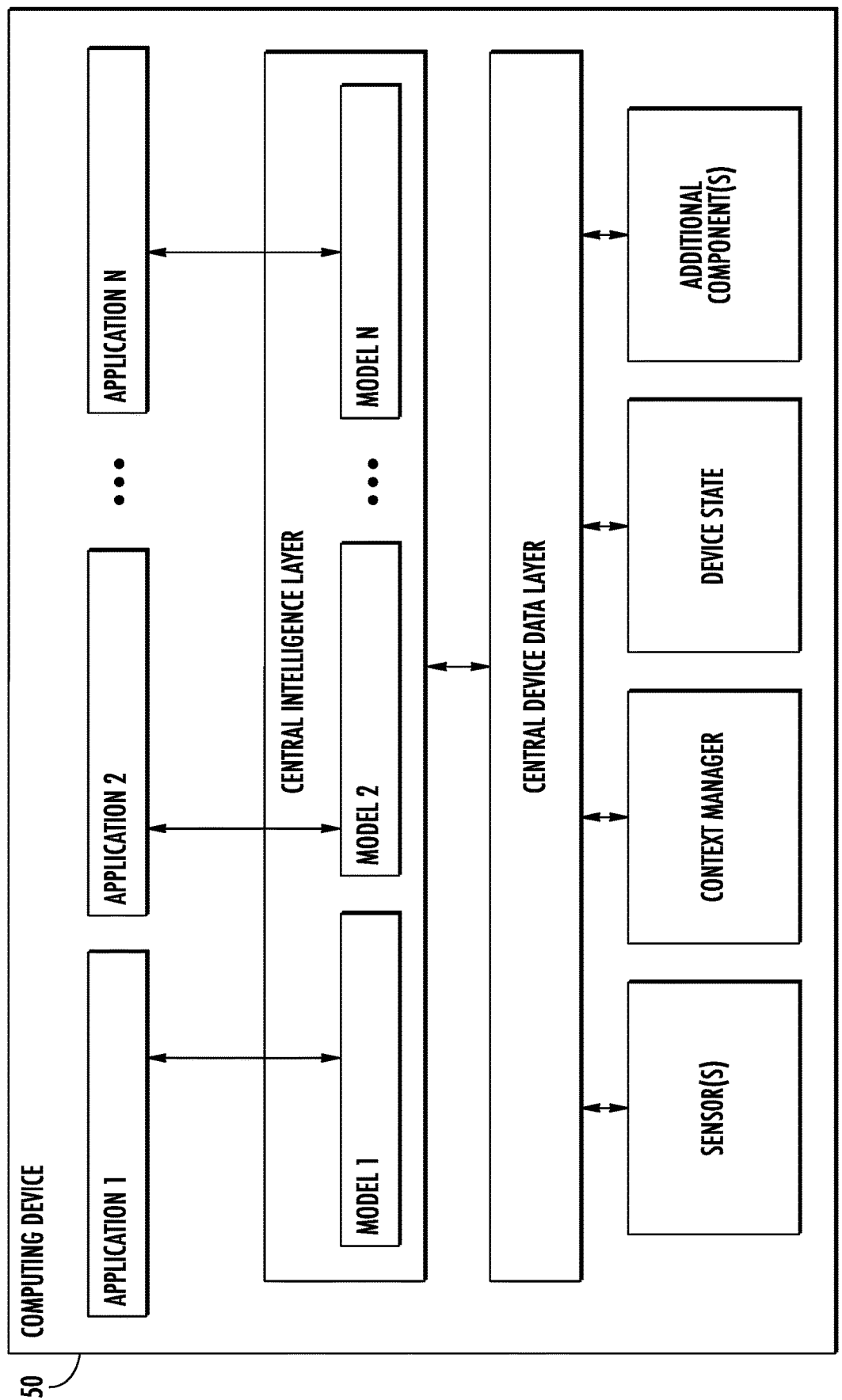
FIG. 1C depicts a block diagram of an example computing device that performs utilization of graphics processors for machine learning inference tasks according to example embodiments of the present disclosure.

FIG. 1C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model can be provided for each application and managed by the central intelligence layer. In other implementations, two or more applications can share a single machine-learned model. For example, in some implementations, the central intelligence layer can provide a single model for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

FIG. 2 depicts a data flow diagram for optimizing utilization of graphics processors for machine learning inference tasks according to example embodiments of the present disclosure. Specifically, as described previously, the significance of certain applications, such as video conferencing, has increased in recent years with an increasing number of meetings held virtually with remote participants. For video conferencing applications, one feature that has become increasingly important in this setting is background replacement or blurring, which is typically achieved through foreground/background segmentation. In conventional high-quality (HQ) segmentation networks, model capacity is usually the critical limitation beyond what central processing unit (CPU) inference can deliver. Accordingly, embodiments of the present disclosure leverage the GPU for real-time model inference of heavier networks. However, existing engines and/or application programming interfaces (APIs), such as JavaScript inference engines featuring WebGL acceleration, exhibit a sizable performance gap compared to others, such as OpenGL inference in a native app.

To achieve maximum performance, some embodiments of the present disclosure are fully executed on the GPU, from acquisition of the input 202 (e.g., image acquisition, etc.) over model (e.g., neural network) inference to providing the output 210 (e.g., rendering the segmented result on the screen).

Conventionally, the basic architecture of a GPU-accelerated neural network inference engine implements neural network operators in the form of GPU shaders. The inference loop is essentially enqueueing these shader programs in topologically sorted order of the neural network into the GPU command queue for asynchronous execution. Authoring such kernel implementations is relatively straightforward with modern GPU APIs supporting compute shaders. However, some existing APIs, such as WebGL, lack support for compute shaders. Thus, in some embodiments, the kernel implementations for a WebGL inference engine can be written in the form of fragment shaders.

Turning to FIG. 2, the input 202 (e.g., an image input) to a machine-learned model can be obtained. Next, in some embodiments, logical and GPU objects can be separated. Logical objects refer to model (e.g., neural network) objects such as tensors, tensor buffers, spatial tensors, weight tensors etc. GPU objects refer to storage types available in APIs (e.g., WebGL) such as 2D texture, 2D texture array, framebuffer, etc. Separating these two types of objects allows the programmer to employ the fastest GPU building blocks for a particular situation, and not be bound to a specific GPU object Next, the renderer 204 processes the input 202 while leveraging features of the API to render a plurality of textures 206. For example, the renderer 204 may leverage WebGL features such as multi render targets (MRT). MRT is a feature of modern GPUs that allows rendering of images to multiple textures at once. When a programmer writes a shader that returns an output value for each render target, the shader renders to all render targets with a single draw call, significantly saving the overhead of multiple draw calls. In such fashion, the input 202 can be rendered by the renderer 204 via MRT to generate textures 206.

The shaders 208 can be generated based at least in part on the plurality of textures 206. Specifically, in some embodiments, a flexible tensor layout and shader code generation may be leveraged to generate the shaders 208. For example, in the naivest form, a tensor of shape [H, W, C] can generally be mapped to a 4-channel 2D texture of size [H, W×C/4]. However, depending on the parallelization of the workload and its memory access pattern, a different layout, with the x-axis and y-axis swapped, may be more efficient than the naive mapping. To be able to optimize various use cases, embodiments of the present disclosure facilitate flexible tensor layouts that can be specified by a user, or determined in real-time. As this must be accompanied by multiple shader implementations that can accommodate the different axis layouts, embodiments of the present disclosure support on-the-fly shader code generation with respect to the active layout to generate the shaders 208. The shaders 208 can process the textures 206 to obtain the machine learning output 210.

In such fashion, Multi-Target rendering can be utilized to substantially increase efficiency of GPU processing for inference. To provide an illustrative example, a convolution can be performed for 32×32×1 to 32×32×1. Using conventional techniques, 32×32 (1024) threads must be run. For example, reading the input value from the source tensor incurs 1 float per thread (1024 float total), reading weight value from weight tensor incurs 1 float per thread (1024 float total), and writing output value to destination tensor incurs 1 float per thread (1024 float total). However, using embodiments of the present disclosure, 16×16 threads (256) could be run in which each thread processes 4× values. For example, reading an input value from the source tensor incurs 4 floats per thread (1024 float total), reading weight values from the weight tensor incurs one float per thread (256 total), and writing the output value to the destination tensor incurs 4 floats per thread (1024 float total) via MRT. Accordingly, 1024 requests can be reduced to 256 total requests.

More specifically, in conventional approaches, logical objects such as tensors are mapped in a one-to-one manner with GPU objects (e.g., textures, buffers, etc.). For example, a three-dimensional tensor (e.g., logical object) with shape [H, W, 3] may be represented as a GL texture (e.g., webGL, etc.) of size [H,W], as GL textures have a depth of 4. Accordingly, the representation of tensors as textures is performed in a hard-coded fashion.

Conversely, embodiments of the present disclosure provide for separation between logical and GPU objects, therefore facilitating mapping of logical and GPU objects outside of a hard-coded one-to-one manner. For example, an input tensor 202 may be represented with 4 GL textures 206. As such, By separating logical and physical objects, execution of shaders 208 can read multiple textures representing an input (e.g., via MRT, etc.). When rendering, the compiler is fully aware of the characteristics of the logical objects, and can transform to GPU objects (e.g., textures, etc.) automatically. As such, a single source representation of an ML operation (e.g., convolution) can use a tensor as input and a tensor as output. However, the storage/layout of these tensors can be determined later on depending on other requirements (e.g., performance, memory consumption, initialization time, GPU capabilities, etc.).

As an example, inference-time processing for a machine-learned model can requested an application programming interface. Model processing can include the following operations: input (512×512×3)>conv1>relu1>depth_wise_conv>conv2>relu2>resize> output (512×512×1). Input 202 can be a gpu_texture (512×512×3) (e.g., width×height×RGB channels). For the initialization stage, GPU programs can be created for conv1+relu1, depth_wise_conv, conv2+relu2, and resize. In some embodiments, relu1 can be performed in a single pass with convolution to save memory bandwidth.

To follow the previous example, GPU objects tensor1 (256×256×16), tensor2 (256×256×16), tensor3 (128×128×1), and tensor 4 (512×512×1) can be created. In some embodiments, tensors can reuse memory. Starting from the input, processing can occur such that tensor0 (input)>conv1+relu1>tensor1>depth_wise_conv>tensor2>conv2+relu2>tensor3>resize>tensor4 (output). In this example, tensor 1 can utilize 4 textures for layout/storage to fully utilize MRT in the conv1+relu1 operation. Tensor 2 can utilize 1 texture to optimize performance for conv2+relu2. Tensor 3 can include 4 textures to facilitate MRT utilization in conv2+relu2 operations, and tensor 4 can include 1 texture to exclude extra conversion for output of the gpu_texture (512×512×1). Specifically, as tensor 2 is an input for conv2+relu2 operations, and tensor 3 is the output of said operations, the combination with best performance can be asymmetric in the number of textures used for tensor representation.

As an example, input 202 can be a tensor of 5 dimensions. Textures 206 can include four textures that are rendered to represent the input tensor 202 at the renderer 204.

It should be noted that embodiments of the present disclosure are described with regards to the WebGL API merely to illustrate the functionality of said embodiments. Specifically, image segmentation is illustrated as CPU inference is not sufficient to run higher capacity image segmentation networks at a high frame rate, and therefore, inference must be performed using available hardware accelerators via certain APIs (e.g., WebGL). While newer accelerators such as the digital signal processor (DSP) and the neural processing unit (NPU) are fragmented and do not have a web standard, the graphics processing unit (GPU) is universally available and has a well-established API for the web, making it a natural choice to illustrate.

Similarly, WebGL is a standard API for GPU rendering for applications executed within a web browser, and supported by all major web browsers. There are a handful of other ML inference engines for the web with WebGL acceleration such as TensorFlow and ONNX runtime web, but the performance of the WebGL acceleration of the existing solutions did not meet expectations, being 3-4 times slower than native performance. Thus, examples of the present disclosure are illustrated via WebGL acceleration.

Some aspects of the present disclosure are based on conventional engines, such as tensor flow. However, the model (e.g., neural network) operations of the present disclosure are implemented via shaders (e.g., fragment shaders), as WebGL does not support compute shaders. MRT is utilized to rephrase these tasks in the language of rendering. MRT allows rendering of images to multiple textures at once with a single draw command, significantly reducing the overhead of multiple draw calls. In some embodiments, to leverage MRT, modifications are applied to existing engine blueprints, such as TFLite GPU. First, logical tensors and physical GPU objects are separated (e.g., which have a 1:1 correspondence in TFLite GPU.) Then, the tensors are allowed to take flexible shapes instead of the hard-coded layout to efficiently employ MRT.

FIG. 3 illustrates a data flow diagram for an implemented decoder block according to some embodiments of the present disclosure. Specifically, FIG. 3 illustrates a decoder block for a segmentation head with 1×1 convolution, batch normalization, and activation layers omitted. As illustrated, decoder block 300 takes a low-resolution segmentation result and a high-resolution skip connection, and outputs a high-resolution result to the next level. It extracts features from the skip connection through channel-wise attention, and adds them to the segmentation result from the previous level. The enriched segmentation is further refined with some convolution layers. For foreground/background segmentation, the head only needs to output a one-channel mask. To illustrate the effectiveness of a segmentation head that includes the decoder block 300, two models are trained with the same backbone (MobileNetV3-Small) and training configurations, but with different heads: LR-ASPP and the head illustrated in FIG. 3. Figure As illustrated in the following table, the segmentation head of FIG. 3 significantly boosts the quality metrics of intersection-over-union (IOU) and boundary F-score, while only adding 8% more parameters:

| Head | # parameters | IOU | F-score |
| --- | --- | --- | --- |
| LR-ASPP | 261K | 91.1% | 0.899 |
| Ours | 281K | 95.9% | 0.944 |

Figure 4A:
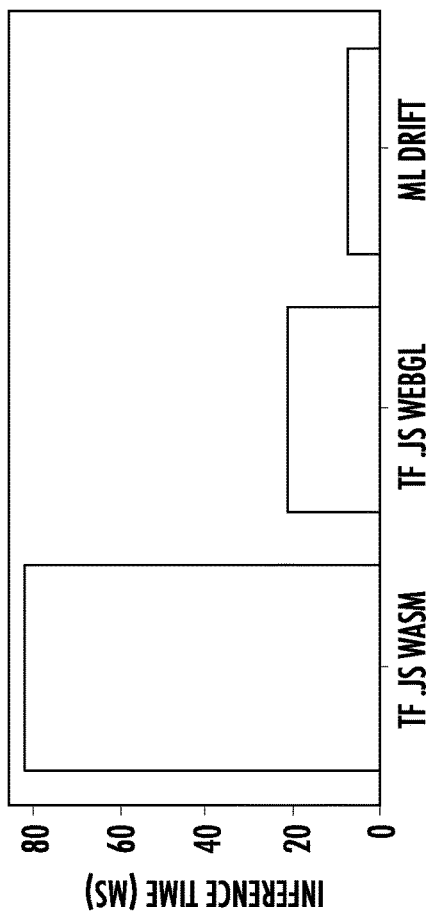
FIG. 4A illustrates results for inference latency for high quality segmentation on various implementations of application programming interfaces according to some embodiments of the present disclosure.

FIG. 4A illustrates results for inference latency for high quality segmentation on various implementations of application programming interfaces according to some embodiments of the present disclosure. Specifically, to evaluate the embodiments of the present disclosure, a focus is placed on in-browser applications, such as web-based video conferencing and AR effects, where ML solutions are running in a sandbox environment without direct access to on-device GPUs. FIG. 4A illustrates inference time utilizing embodiments of the present disclosure (e.g., ML Drift) versus other inference engines, such as TensorFlow.js (TF.js) WebAssembly (Wasm) and WebGL. The Wasm backend is accelerated by SIMD instructions, TF.js WebGL backend utilizes GPU to accelerate model inference, and similar implementations are available in other engines with comparable performance.

Figure 4B:
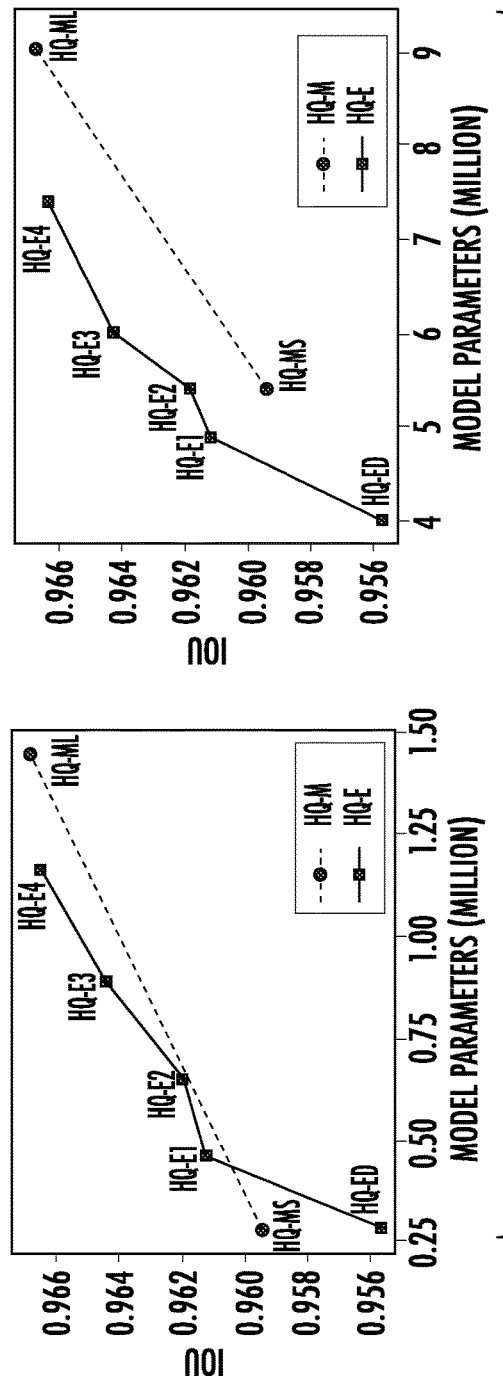
FIG. 4B illustrates results for evaluation of high quality segmentation models according to some embodiments of the present disclosure.

FIG. 4B illustrates results for evaluation of high quality segmentation models according to some embodiments of the present disclosure. Specifically, utilizing embodiments of the present disclosure, HQ models can be run with larger capacities and image sizes in browsers. For evaluation two groups of segmentation models are trained according to some embodiments of the present disclosure: HQ-MS, HQ-ML, and HQ-E0–E4. The first two are based on small and large versions of MobileNetV3. The remaining five are based on EfficientNet-Lite with increasing model sizes. All models are equipped with our segmentation head and trained with the same data and hyperparameters. The input image size is 512×288

As depicted in FIG. 3, the HQ-MS model shows higher quality than HQ-E0 with a comparable model size. This demonstrates the effectiveness of the SE for small-sized models. As model size increases, the two groups of HQ models show similar values of quality metrics. For the models of comparable inference time, HQ-E models have consistently higher quality than HQ-M models, with noticeable margins. This is due to the global pooling in the squeeze-and-excite layers, which is challenging for GPU acceleration.

Figure 5A:
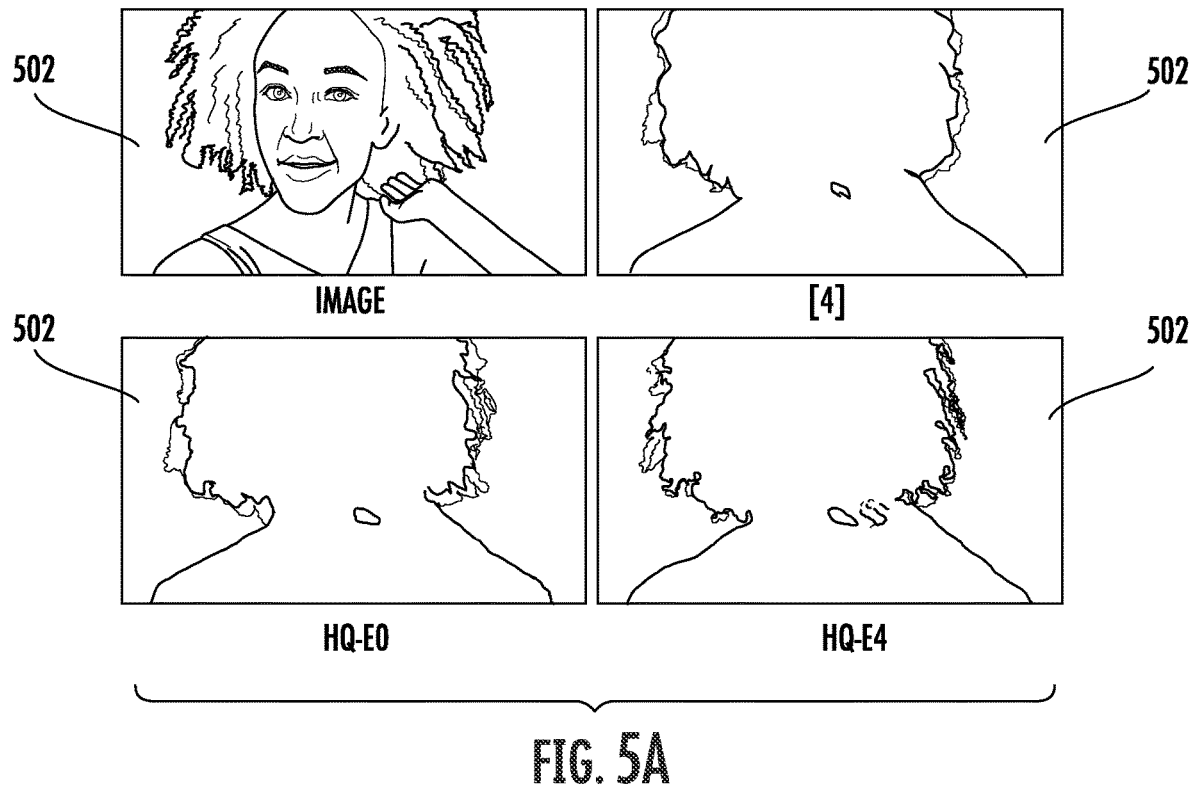
FIG. 5A illustrates image segmentation results utilizing two models processed according to some embodiments of the present disclosure.

FIG. 5A illustrates image segmentation results utilizing two models processed according to some embodiments of the present disclosure. In particular, FIG. 5A illustrates improvements in image segmentation in comparison to conventional techniques. For example, image 502 is an image of a particular input size (e.g., 512×288 pixels, etc.). Image segmentation result 504 is the output of a conventional CPU-based image segmentation model. As depicted, the segmentation result demonstrates substantial loss of detail. Image segmentation results 506 and 508 are the outputs of two machine-learned models constructed according to two particular implementations of the present disclosure. As illustrated, unlike the image segmentation results 504 generated using conventional models, the image segmentation results 506 and 508 retain substantially more detail.

Figure 5B:
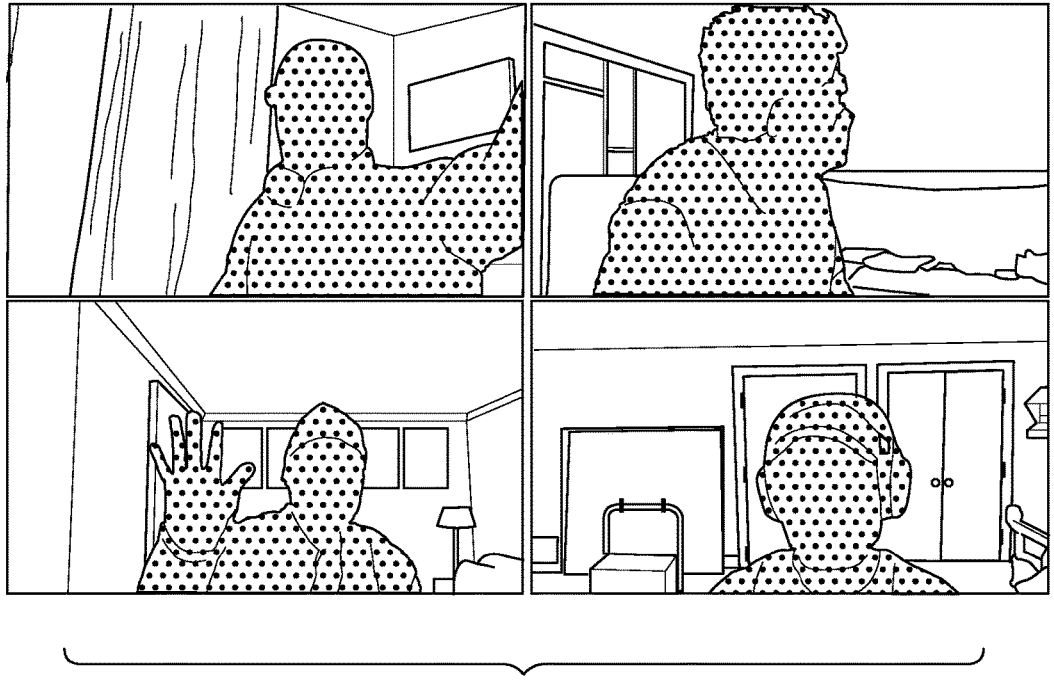
FIG. 5B illustrates high quality segmentation results utilizing two models processed according to some embodiments of the present disclosure.

FIG. 5B illustrates high quality segmentation results utilizing two models processed according to some embodiments of the present disclosure.

Figure 6:
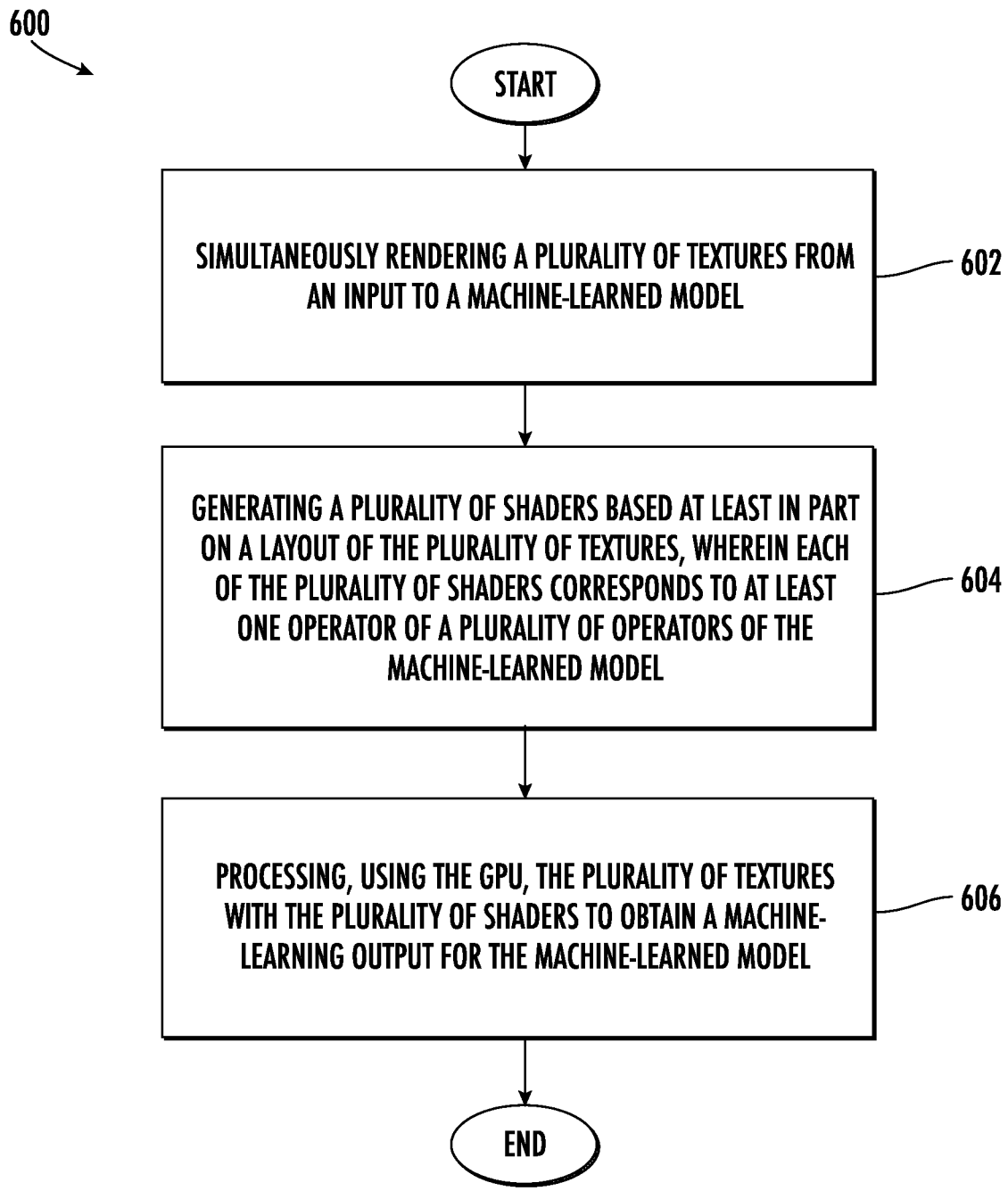
FIG. 6 is a data flow diagram for a method for optimizing graphics processing for machine learning inference according to some embodiments of the present disclosure.

FIG. 6 depicts a flow chart diagram of an example method to perform according to example embodiments of the present disclosure. Although FIG. 6 depicts operations performed in a particular order for purposes of illustration and discussion, the methods of the present disclosure are not limited to the particularly illustrated order or arrangement. The various operations of the method 600 can be omitted, rearranged, combined, and/or adapted in various ways without deviating from the scope of the present disclosure.

At operation 602, a computing system can include a Graphics Processing Unit (GPU). The computing system can simultaneously render a plurality of textures from an input to a machine-learned model. For example, the computing system can render the textures via a Multi-Render Target (MRT) process of a WebGL Application Programming Interface (API). The machine-learned model can be associated with an application that uses the WebGL API. For example, the application can be a gaming application that renders textures using the WebGL API, and the machine-learned model can be a model associated with the gaming application. In some implementations, the application can be executed in a web browser. Additionally, or alternatively, in some implementations, the application can be a videoconferencing application.

In some implementations, the plurality of textures can be simultaneously rendered by the computing system using the GPU. For example, the input to the machine-learned model can be an image. The computing system can utilize rendering software and/or hardware of the GPU to simultaneously render textures that are representative of the image. In other words, the computing system can, in some implementations, simultaneously render a plurality of textures that is representative of the machine-learned model (e.g., a plurality of textures that collectively represent an image input or a tensor derived from an input image, etc.).

More specifically, the MRT process is a feature of the WebGL API that allows rendering of inputs, such as images, to multiple textures at once. Although this is conventionally used for rendering, it can also be used for machine-learned inference. For example, for an image segmentation task, a plurality of textures can be simultaneously rendered from the image to be segmented. The textures can then be processed with machine-learned model objects that are represented by shaders (e.g., fragment shaders). This allows for usage of the GPU, rather than a central processor, and also facilitates parallel processing to substantially increase performance, efficiency, and accuracy of the machine-learned model.

In some implementations, prior to simultaneously rendering the plurality of textures, the computing system can obtain the input to the machine-learned model. The machine-learned model can be trained to perform a task associated with the input. For example, the input to the machine-learned model can be, or otherwise include, image data, and the task the machine-learned model is trained to perform can be an image segmentation task.

At operation 604, the computing system can generate a plurality of shaders based at least in part on a layout of the plurality of textures. Each of the plurality of shaders can correspond to at least one operator of a plurality of operators of the machine-learned model. For example, the plurality of shaders can be a plurality of fragment shaders.

In some implementations, prior to generating the plurality of shaders, the computing system can determine a plurality of GPU objects indicative of available processing capabilities of the GPU. The computing system can determine the layout of the plurality of textures based at least in part on the plurality of GPU objects. In other words, the layout of the plurality of textures can be determined based on the processing capabilities of the GPU. In some implementations, the layout of the textures can be specified by a user.

At operation 606, the computing system can process the plurality of textures with the plurality of shaders to obtain a machine-learning output for the machine-learned model. In some implementations, to process the shaders, the computing system can extract the machine learning output from an intermediate representation. For example, the machine-learning output can be, or otherwise include, an intermediate texture output representative of the machine-learning output. The computing system can extract the machine-learning output from the intermediate texture output.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computing system for optimizing utilization of graphics processors for machine learning inference tasks, comprising:
one or more processors, wherein the one or more processors comprises a Graphics Processing Unit (GPU);
one or more non-transitory computer-readable media that collectively store instructions that, when executed by the one or more processors, cause the computing system to perform operations, the operations comprising:
simultaneously rendering, via a Multi-Render Target process of a WebGL application programming interface, a plurality of textures from an input to a machine-learned model;
generating a plurality of shaders based at least in part on a layout of the plurality of textures, wherein each of the plurality of shaders corresponds to at least one operator of a plurality of operators of the machine-learned model; and
processing, using the GPU, the plurality of textures with the plurality of shaders to obtain a machine-learning output for the machine-learned model.

2. The computing system of claim 1, wherein the machine-learned model is associated with an application that utilizes the WebGL application programming interface.

3. The computing system of claim 2, wherein the application is executed in a web browser.

4. The computing system of claim 3, wherein the application is a videoconferencing application.

5. The computing system of claim 1, wherein the plurality of textures are simultaneously rendered using the GPU.

6. The computing system of claim 1, wherein the plurality of textures are representative of the input to the machine-learned model.

7. The computing system of claim 1, wherein, prior to generating the plurality of shaders, the operations comprise:
determining, by the computing system, a plurality of GPU objects indicative of available processing capabilities of the GPU; and
determining, by the computing system, the layout of the plurality of textures based at least in part on the plurality of GPU objects.

8. The computing system of claim 1, wherein the layout of the plurality of textures is specified by a user.

9. The computing system of claim 1, wherein the plurality of shaders comprise a plurality of fragment shaders.

10. The computing system of claim 1, wherein the input to the machine-learned model comprises:
an image; or
a tensor derived from the image.

11. The computing system of claim 1, wherein the machine-learning output comprises an intermediate texture output representative of the machine learning output, and wherein processing the plurality of shaders further comprises extracting, by the computing system, the machine learning output from the intermediate texture output.

12. The computing system of claim 11, wherein, prior to simultaneously rendering the plurality of textures, the operations comprise obtaining, by the computing system, the input to the machine-learned model, wherein the machine-learned model is trained to perform a task associated with the input.

13. The computing system of claim 12, wherein the input to the machine-learned model comprises image data, and wherein the task the machine-learned model is trained to perform comprises an image segmentation task.

14. A computer-implemented method for optimizing utilization of graphics processors for machine learning inference tasks, wherein the method comprises:
- simultaneously rendering, by a computing system comprising one or more computing devices, via a Multi-Render Target process of a WebGL application programming interface, a plurality of textures from an input to a machine-learned model;
- generating, by the computing system, a plurality of shaders based at least in part on a layout of the plurality of textures, wherein each of the plurality of shaders corresponds to at least one operator of a plurality of operators of the machine-learned model; and
- processing, by the computing system using a Graphics Processing Unit (GPU), the plurality of textures with the plurality of shaders to obtain a machine-learning output for the machine-learned model.

15. The computer-implemented method of claim 14, wherein the machine-learned model is associated with an application that utilizes the WebGL application programming interface.

16. The computer-implemented method of claim 15, wherein the application is executed in a web browser.

17. The computer-implemented method of claim 16, wherein the application is a videoconferencing application.

18. One or more non-transitory computer-readable media that collectively store instructions that, when executed by one or more processors, cause the one or more processors to perform operations, the operations comprising:
- simultaneously rendering, via a Multi-Render Target process of a WebGL application programming interface, a plurality of textures from an input to a machine-learned model;
- generating a plurality of shaders based at least in part on a layout of the plurality of textures, wherein each of the plurality of shaders corresponds to at least one operator of a plurality of operators of the machine-learned model; and
- processing, using a Graphics Processing Unit (GPU), the plurality of textures with the plurality of shaders to obtain a machine-learning output for the machine-learned model.

* * * * *